United States Patent Office 3,218,356
Patented Nov. 16, 1965

3,218,356
TRIBUTYL-2,4-DICHLOROBENZYLAMMONIUM
CHLORIDE
Thomas Mason Melton, Richmond, Va., assignor to Socony Mobil Oil Company, Inc., a corporation of New York
No Drawing. Filed Oct. 25, 1962, Ser. No. 233,142
1 Claim. (Cl. 260—567.6)

This invention relates to a new composition of matter having utility as a fungicide. In particular, this invention is concerned with the compound of the formula

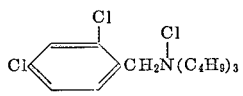

and with fungicidal compositions containing minor amounts of it in combination with a major amount of an inert carrier therefor.

In spite of the enormous amount of work which has been done on the protection of plants from attack by harmful fungi, there are still comparatively few good fungicides available. One of the reasons why this is true is that the fungi are plants themselves, thus being similar in many of their properties, reactions and responses to the host plant. For this reason, materials applied to destroy fungi on plants are sometimes likely to injure the host plant. Many compounds which are good potential fungicides have insufficient resistance to sun irradiation or high temperatures, particularly under unusually humid conditions.

A compound has been found which overcomes, to a large extent, the disadvantages mentioned above. The compound is produced by reacting 2,4-dichlorobenzyl chloride with tributylamine. The reaction involving these two materials to produce the product of the invention is not a straight-forward one, however. It proceeds extremely slowly at room temperature, requiring several months to produce any appreciable amount of the product. At temperatures of from about 85–100°, the product of the invention apparently forms and rapidly degrades. It is not known, at present, whether or not it degrades to the starting materials.

It has been found that a product equal in all respects, save one, to that obtained by slow reaction can be obtained by heating 2,4-dichlorobenzyl chloride and excess tributylamine in an inert organic solvent at from about 70–85° C. for several hours, subsequently removing solvent and unreacted materials, dissolving the product layer in water and removing the water. The product thus obtained is a viscous oil which will not crystallize naturally as does the product formed by slow reaction at room temperature. This may be due to its hygroscopicity and because of the difficulty in removing the last traces of water. In practice, hygroscopicity of the chemical will be no deterrent to its use as a fungicide, since it is water soluble and will in most instances be used in aqueous media.

Obviously, in view of the above, temperature is a critical factor. Only a relatively narrow range will suffice to give a usable process for the production of the tributyl-2,4-dichlorobenzylammonium chloride. Below about 70° C., the reaction remains too slow for practical purposes. Severe decomposition begins at approximately 85° C., and at some point between 85° and about 100° C., no product at all is obtained. The preferred temperature, the one at which the best yields are obtained, is within the narrow 75–80° C. range.

Following, for comparison purposes, are the two methods employed in producing the chemical of this invention. It will be evident therefrom that the low temperature method is not adaptable to commercial production. Parts are by weight.

*Example 1*

Eighteen and fifty-four one-hundredths parts of tributylamine and 19.54 parts of 2,4-dichlorobenzyl chloride were placed in a 250-ml. glass stoppered flask. 70.8 parts of diethyl ether was added and the flask tightly stoppered and allowed to react at room temperature. After a considerable time an oil began to form and after 2 to 3 months, the product began to crystallize. At the end of six months, the crystals were filtered, washed with hexane and dried under vacuum. 16.7 parts of tributyl-2,4-dichlorobenzylammonium chloride was obtained, the compound having 3.33% nitrogen. The calculated value for nitrogen (for $C_{19}H_{32}Cl_3N$) is 3.69%.

*Example 2*

One hundred eighty-five and four-tenths parts of tributylamine and 97.8 parts of 2,4-dichlorobenzyl chloride were mixed with 78.5 parts of isopropanol and placed in a reactor equipped with a stirrer, condenser and thermometer. The mixture was heated for 6 hours with stirring at 80° C., after which the isopropanol and excess tributylamine were removed by distillation at 2 mm. and 80° C. 124.2 parts of crude product was obtained. The crude product was dissolved in 300 parts of water, and the water solution was washed with about 50 parts of hexane. The hexane was separated from the water and the water was removed by distillation, giving a recovery from the wash step of 67% tributyl-2,4-dichlorobenzylammonium chloride. Following were the properties of the product:

Refractive index at 24° C., 1.5292.
Ionic Cl (calc.) 9.31%; Cl (found) 9.34% (Volhard).

In Example 2, the water was distilled away from the product. It will be apparent, however, that when aqueous formulations are desired, removal of the water may not be necessary.

Whereas diethyl ether and isopropanol were used in the examples, other inert organic solvents may be used. These will be obvious to those in the art. It is not essential that the product of the invention be soluble in the solvent used, but for the best mixing, the reactants must be soluble therein. It will be apparent that if the product is soluble in the solvent, its boiling point must be such as to allow easy separation of the product therefrom.

When used as a fungicide, the chemical of this invention is most conveniently applied in conjunction with a liquid or solid inert carrier containing a minor amount of the said chemical. The preferred formulation will contain from about 100 p.p.m. to 1000 p.p.m. This does not represent the total range, for under certain adverse conditions more than 1000 p.p.m. will be required; under ideal conditions, 100 p.p.m. may be more than is required for effective fungicidal action.

Since the chemical is water-soluble, water will be the usual solvent. When water is used, it may contain a small quantity of one of the surface active agents well known to the art. An example of a useful surface active agent is Atlox G-2081 (a mixture of 30% alkyl aryl sulfonates and 70% polyoxyethylene sorbitan esters of mixed fatty and resin acids). Additionally, the chemical may be dissolved in a volatile solvent such as acetone, or other organic solvent, and deposited on the parasite host by evaporation of the solvent. Obviously this method will require a solvent which has a high rate of evaporation and which is not phytotoxic to the plant host. The chemical may also be mixed with an inert solid such as talc, bentonite, attapulgite, ground walnut hulls, and the like. Although the chemical is hygroscopic, water is present in such small quantities that it will not cause caking of the solid formulation.

Generally speaking any of the well-known methods of applying these formulations may be used.

I claim:
Tributyl-2,4-dichlorobenzylammonium chloride.

References Cited by the Examiner
UNITED STATES PATENTS

| 2,134,917 | 11/1938 | Harris. | |
| 2,271,378 | 1/1942 | Searle. | |
| 2,295,504 | 9/1942 | Shelton. | |
| 2,295,505 | 9/1942 | Shelton. | |
| 2,317,999 | 5/1943 | Leuchs | 260—561 |
| 2,692,264 | 10/1954 | Wojcik | 260—567.6 X |
| 2,826,582 | 3/1958 | Miller | 260—567.6 X |
| 3,037,910 | 6/1962 | Copp et al. | 260—567.6 X |
| 3,050,521 | 8/1962 | Niederhauser | 260—567.6 X |

OTHER REFERENCES

Beard et al.: J. Org. Chem., vol. 25, pp. 334 to 343 (1960).

Furukawa: C.A., vol. 53, p. 19435d (1959).

Houben-Weyl: "Methoden der Organischen Chemie," vol. 11/2, page 601 (1958).

Lawrence: "Quaternary Amoniam Germicides," pp. 99–102 (1950).

Marvel et al.: J.A.C.S., vol. 51, pp. 3638–3641 (1929).

Ross et al.: J. Colloid Sci., vol. 8, pp. 385–401 (1953).

CHARLES B. PARKER, *Primary Examiner.*